(12) United States Patent
Matsushita et al.

(10) Patent No.: US 11,664,621 B2
(45) Date of Patent: May 30, 2023

(54) CONNECTOR AND CONNECTOR WITH ELECTRIC WIRES INCLUDING THE CONNECTOR

(71) Applicant: Yazaki Corporation, Tokyo (JP)

(72) Inventors: Yuki Matsushita, Kakegawa (JP); Shinsuke Aoshima, Fujieda (JP); Tomoki Kato, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/503,564

(22) Filed: Oct. 18, 2021

(65) Prior Publication Data

US 2022/0123496 A1 Apr. 21, 2022

(30) Foreign Application Priority Data

Oct. 19, 2020 (JP) .............................. JP2020-175123

(51) Int. Cl.
| | |
|---|---|
| *H01R 13/50* | (2006.01) |
| *H01R 13/40* | (2006.01) |
| *H01R 4/34* | (2006.01) |
| *H01R 11/12* | (2006.01) |
| *H01R 4/56* | (2006.01) |

(52) U.S. Cl.
CPC .............. *H01R 13/50* (2013.01); *H01R 13/40* (2013.01); *H01R 4/34* (2013.01); *H01R 4/56* (2013.01); *H01R 11/12* (2013.01); *H01R 2201/26* (2013.01)

(58) Field of Classification Search
CPC .......... H01R 13/50; H01R 13/40; H01R 4/34; H01R 4/56; H01R 11/12; H01R 2201/26; H01R 13/502; H01R 13/5841; H01R 13/46; H01R 24/00; Y02T 10/70; Y02T 10/7072; Y02T 90/14; B60L 53/16
See application file for complete search history.

(56) References Cited

U.S. PATENT DOCUMENTS

| | | | |
|---|---|---|---|
| 8,342,880 B2* | 1/2013 | Kato ................... | H01R 13/4226 |
| | | | 439/382 |
| 8,585,427 B2 | 11/2013 | Ukawa et al. | |
| 9,059,534 B2* | 6/2015 | Endo .................. | H01R 13/5205 |
| 9,673,577 B2 | 6/2017 | Chang | |
| 9,882,315 B2* | 1/2018 | Neureiter ............... | H01R 24/38 |
| 10,062,974 B2* | 8/2018 | Okamoto ................ | H01R 4/34 |
| 10,511,129 B1 | 12/2019 | Jung et al. | |

(Continued)

FOREIGN PATENT DOCUMENTS

| | | |
|---|---|---|
| CH | 358486 A | 11/1961 |
| DE | 202011101451 U1 | 11/2011 |

(Continued)

*Primary Examiner* — Travis S Chambers
(74) *Attorney, Agent, or Firm* — Sughrue Mion, PLLC

(57) ABSTRACT

A connector with electric wires includes a housing mounted to a vehicle body, two terminals housed in the housing, and two electric wires each connected to the terminal. The two electric wires are drawn out from openings of the housing with the two electric wires disposed in a longitudinal direction (arrow Y direction) and extended straight in a direction (arrow X direction) orthogonal to the longitudinal direction of the terminal. Inside the housing, the two terminals and the two electric wires are arranged on the same plane.

4 Claims, 6 Drawing Sheets

(56) References Cited

U.S. PATENT DOCUMENTS

| | | | |
|---|---|---|---|
| 2002/0173205 A1* | 11/2002 | Kato | H01R 13/4367 |
| | | | 439/752 |
| 2006/0019537 A1* | 1/2006 | Ishizaki | H01R 13/405 |
| | | | 439/606 |
| 2007/0105427 A1* | 5/2007 | Mori | H01R 11/03 |
| | | | 439/364 |
| 2020/0153173 A1 | 5/2020 | Kurita | |
| 2020/0169011 A1 | 5/2020 | Kurita | |

FOREIGN PATENT DOCUMENTS

| | | |
|---|---|---|
| EP | 2955796 A1 | 12/2015 |
| JP | 2-32676 U | 2/1990 |
| JP | 2014-53091 A | 3/2014 |

\* cited by examiner

CONNECTOR AND CONNECTOR WITH ELECTRIC WIRES INCLUDING THE CONNECTOR

TECHNICAL FIELD

The present invention relates to a connector and a connector with electric wires including the connector.

BACKGROUND

FIG. 5 is a cross-sectional view of a conventional connector. This connector 301 is configured to be attached to a vehicle body of an electric vehicle and fitted to a power supply connector (i.e., a mating connector) outside the vehicle body to charge a battery of the electric vehicle. Such connector is commonly referred to as "vehicle inlet".

The connector 301 includes a housing 302 and a plurality of terminals 303 housed in the housing 302. The terminal 303 includes a mating-side connecting portion 331 connected to a terminal of the power supply connector, and a wire-side connecting portion 332 connected to an electric wire 305 inside the vehicle body. An arrow K shown in FIG. 5 indicates a fitting direction of the connector 301 with respect to the power supply connector.

The electric wires 305 are drawn out from a rear surface of the housing 302 in the connector fitting direction K, are bent at the rear of the connector 301 in a direction orthogonal to the connector fitting direction K and wired to the battery side. In order to bend the electric wires 305 without damaging them, a bending radius needs to be a certain radius or more. Further, rubber stoppers 313 are mounted on outer circumferences of the electric wires 305 and at the rear of the wire-side connecting portions 332, providing waterproofing between the electric wires 305 and the housing 302. Considering the sealing performance of the rubber stopper 313, it is not preferable to bend the electric wire 305 in the vicinity of the rubber stopper 313, thus the bending of the electric wire 305 starts from a position a predetermined distance away from the rubber stopper 313.

Thus, there is a drawback in the connector 301 that a space is required at the rear of the connector 301 for bending the electric wires 305 drawn out from the rear surface of the housing 302. Further, when the waterproofing is provided between the electric wires 305 and the housing 302 by the rubber stoppers 313 as described above, a further large space is required at the rear of the connector 301.

Patent Document 1 discloses a connector which overcomes the above-described drawback. As shown in FIG. 6, a connector 401 of Patent Document 1 includes a housing 430, a plurality of terminals 420 housed in the housing 430, a plurality of electric wires 440 inside the vehicle body, a round terminal (relay terminals) 450 crimped to an end of each electric wire 440, a bolt 454 fixing each round terminal 450 to a rear end of each terminal 420, and a terminal holding member 460 for preventing the terminals 420 from falling off from the housing 430. An arrow K shown in FIG. 6 indicates a fitting direction of the connector 401 with respect to a power supply connector. The electric wires 440 connected to the terminals 420 via the round terminals 450 are drawn out from a gap between the housing 430 and the terminal holding member 460 in a direction orthogonal to the connector fitting direction K.

In the connector 401, as compared with the connector 301 of FIG. 5, the space at the rear of the connector 401 is not required; however, the connector 401 has a drawback that, since the electric wires 440 are diverted so as not to interfere with each other and then aligned in the same direction, size of the connector 401 is increased in a direction indicated by an arrow L in FIG. 6.

PRIOR ART DOCUMENT

Patent Document 1: JP 2014-53091 A

SUMMARY OF THE INVENTION

Problem to be Solved by the Invention

To overcome the above-described drawback, an object of the present invention is to downsize a connector and reduce an installation area for the connector.

Solution to the Problem

In order to achieve the above-described object, the present invention provides, in one aspect, a connector including a housing and a plurality of terminals housed in the housing, wherein each of the terminals is arranged to extend in a linear direction, one end side of each of the terminals is configured to be connected to a mating connector, and another end side of each of the terminals is configured to be connected to an electric wire, the plurality of terminals and a plurality of the electric wires connected to the plurality of terminals are arranged on the same plane in the housing, and the plurality of electric wires is drawn out from an opening of the housing with the plurality of electric wires disposed in the linear direction and extended straight.

The present invention further provides a connector with electric wires including the above-described connector and a plurality of electric wires.

Advantageous Effect of the Invention

According to the present invention, as compared with the conventional product (FIG. 5) in which the electric wires are drawn out from the rear surface of the housing and bent, the space at the rear of the connector is not required, thus it is possible to reduce an installation area for the connector. Further, since the plurality of electric wires is drawn out from the opening of the housing with the plurality of electric wires extended straight, it is possible to downsize the connector as compared with the conventional product in which the electric wires are diverted so as not to interfere with each other and then aligned in the same direction (FIG. 6).

DETAILED DESCRIPTION OF THE EXEMPLARY EMBODIMENTS

Figure 5:
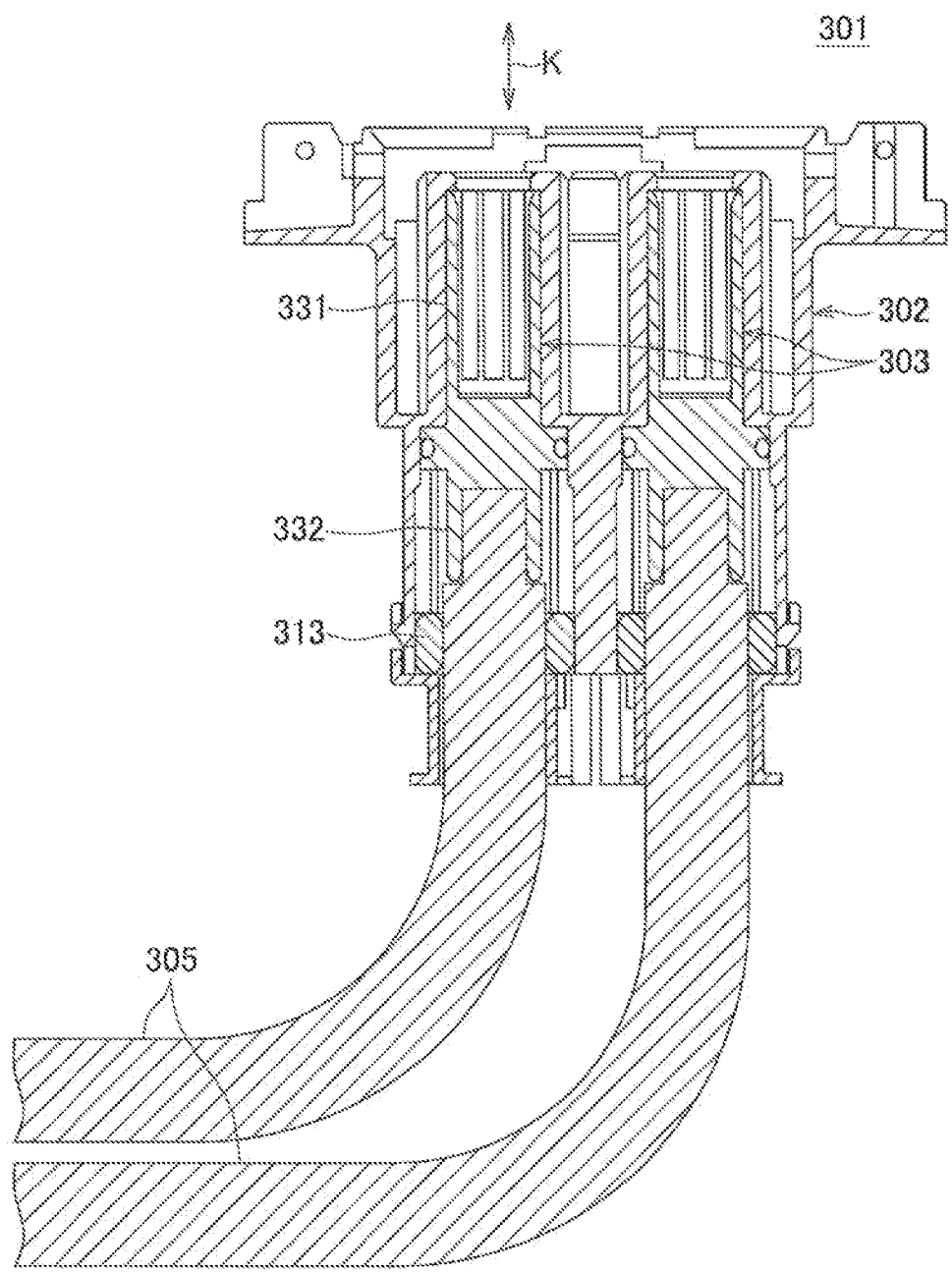
FIG. 5 is a cross-sectional view of a conventional connector.
Figure 6:
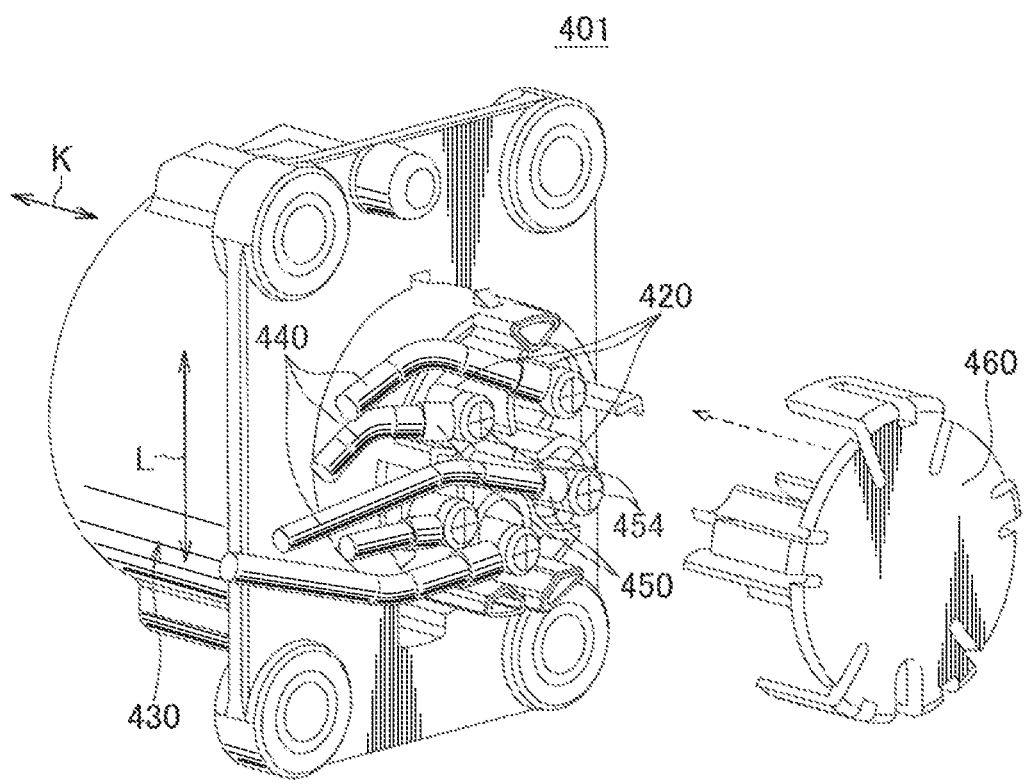
FIG. 6 is an exploded view of another conventional connector.

In the following, "connector" and "connector with electric wires" provided with the connector according to one embodiment of the present invention will be described with reference to FIG. 1 to FIG. 4. Similar to the conventional product (FIG. 5 and FIG. 6), the connector of this example is configured to be attached to a vehicle body of an electric vehicle and fitted to a power supply connector (i.e., a mating connector) outside the vehicle body to charge a battery of the electric vehicle.

As shown in FIG. 1 to FIG. 4, a connector 1 includes a housing 2 configured to be mounted to the vehicle body, a plurality of terminals 3 housed in the housing 2, an insulating member 4 mounted in the housing 2, and packings 11 and 12. A state in which the connector 1 and a plurality of electric wires 5 are connected to each other is referred to as "connector with electric wires" and is denoted by a reference sign 10.

In this example, the connector with electric wires 10 includes two terminals 3 of the same shape and the same size, and two electric wires 5 connected to the terminals 3, respectively. The electric wire 5 is a power wire including a conductive core wire and an insulating sheath covering the core wire, and is wired inside the vehicle body and connected to the battery of the electric vehicle. A round terminal (sometimes referred to as a LA terminal) 6 including a wire crimping portion and a through hole 60 is crimped to an end of each electric wire 5. The round terminal 6 is hereinafter referred to as a wire-side terminal 6. Further, a tube-shaped rubber stopper 13 is mounted on an outer circumference of each electric wire 5.

Figure 1:
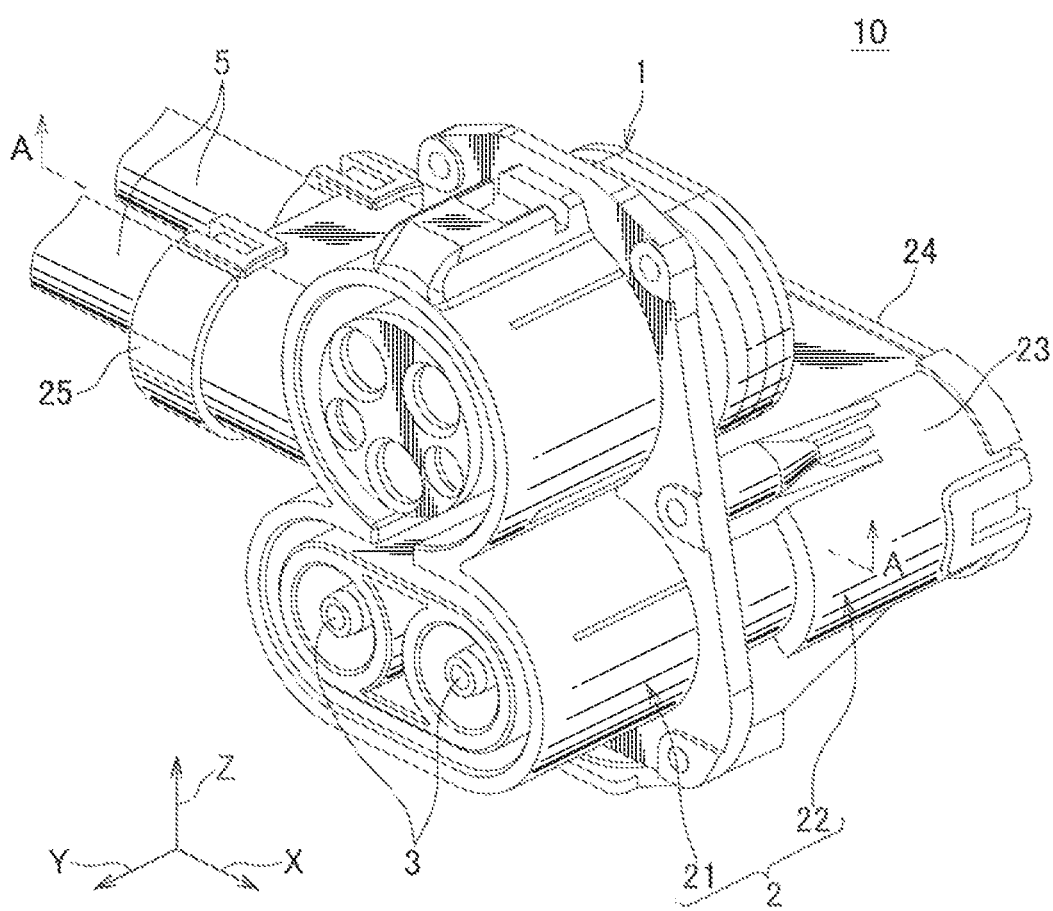
FIG. 1 is a perspective view of a connector according to one embodiment of the present invention.
Figure 2:
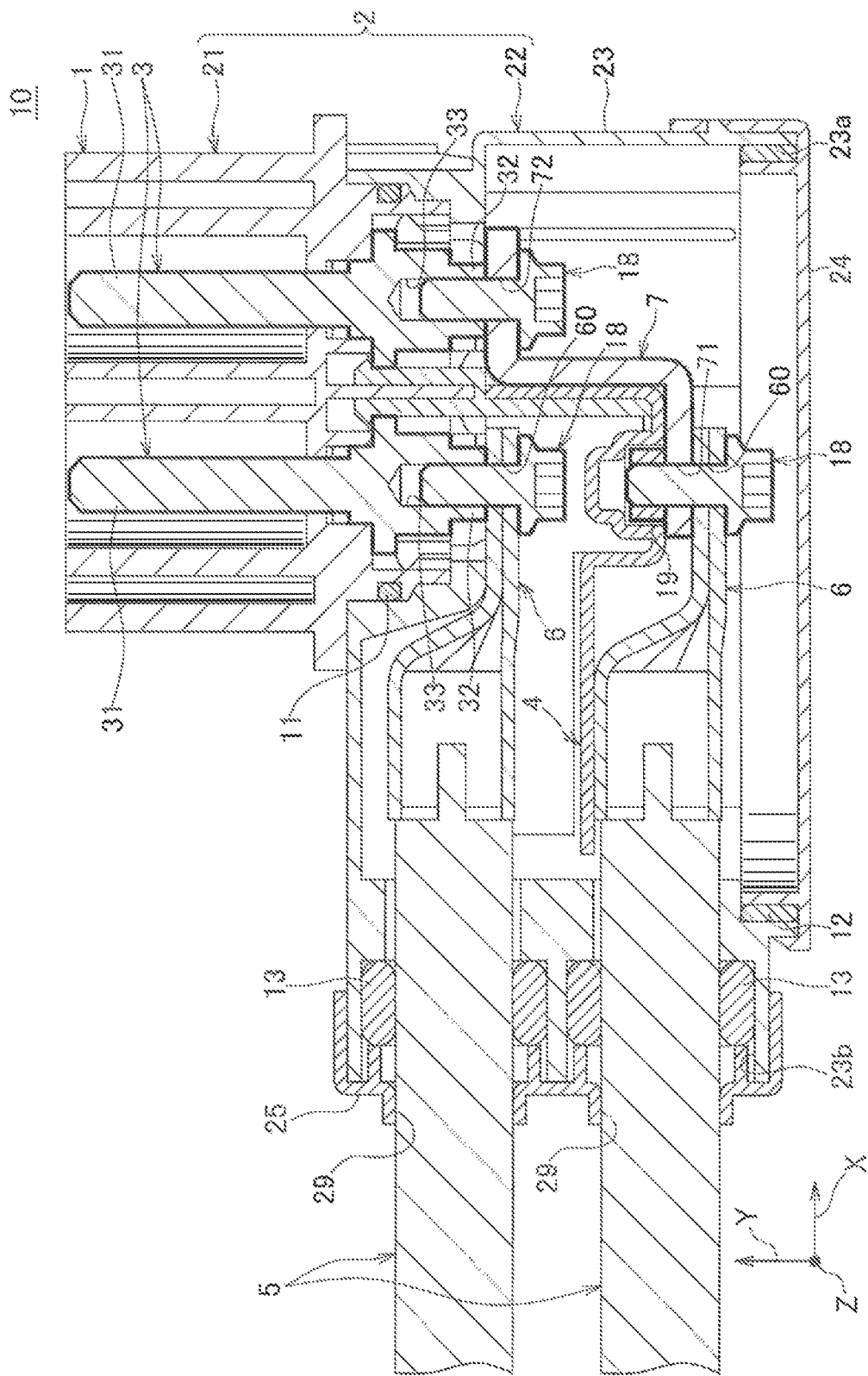
FIG. 2 is a cross-sectional view taken along a line A-A in FIG. 1.
Figure 3:
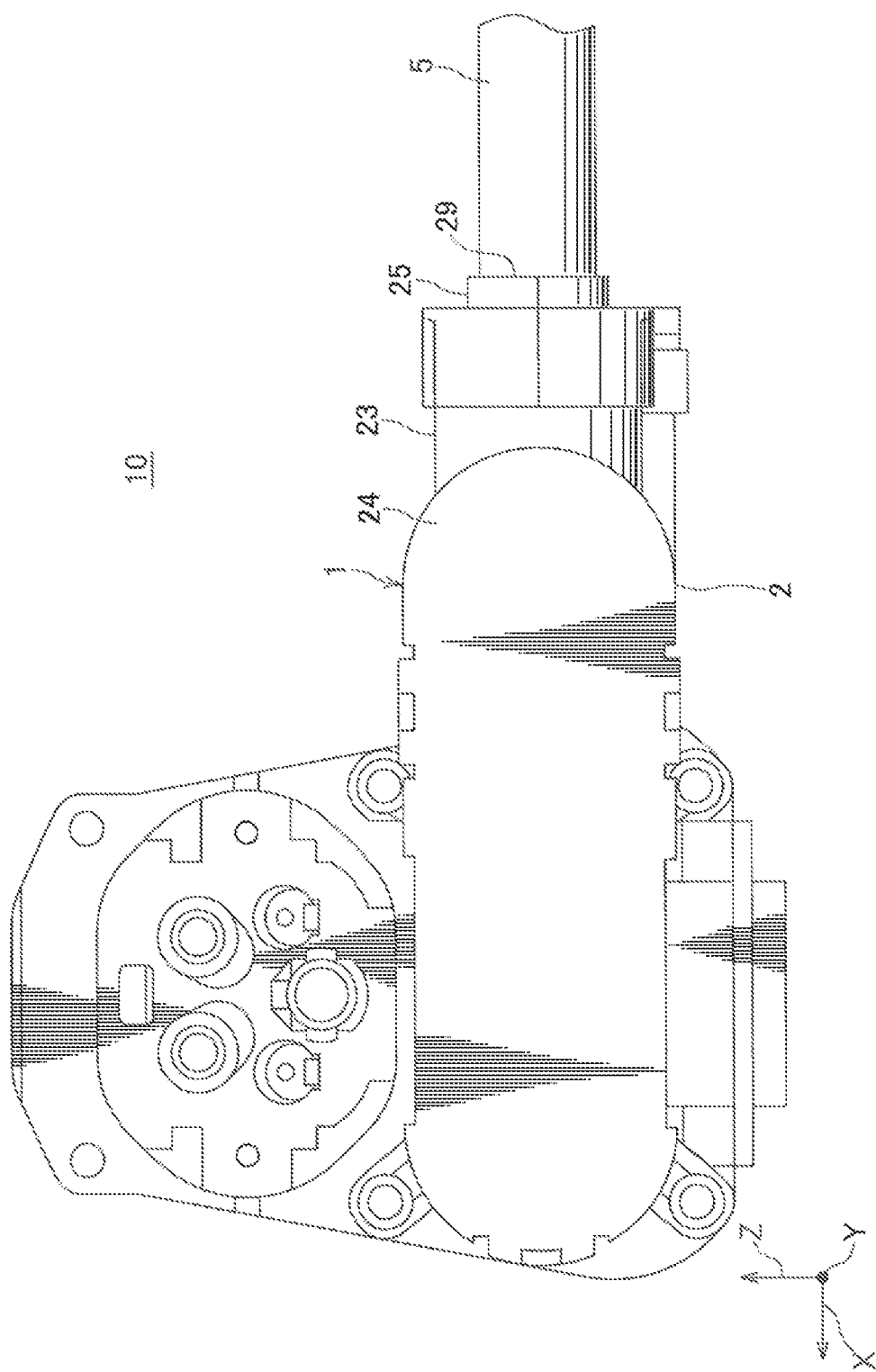
FIG. 3 shows the connector of FIG. 1 viewed from another angle.

Further, with respect to one of the two electric wires 5 described above, an intermediate terminal 7 is attached to the wire-side terminal 6. The intermediate terminal (sometimes referred to as a bus bar) 7 is a strip-shaped metal plate that is bent at a right angle at two locations, and through holes 71 and 72 are formed at one end and another end thereof. As shown in FIG. 2, the through hole 71 at one end of the intermediate terminal 7 is placed on the through hole 60 of the wire-side terminal 6, and a bolt 18 is passed through the through holes 60 and 71 so that a nut 19 is screwed to the bolt 18 to attach the intermediate terminal 7 to the wire-side terminal 6.

As shown in FIG. 2, each terminal 3 includes a mating-side connecting portion 31 which is connected to a terminal of the power supply connector, and a wire-side connecting portion 32 which is connected to the electric wire 5. In this example, the wire-side connecting portion 32 is indirectly connected to the electric wire 5 via the wire-side terminal 6 and the intermediate terminal 7 described above.

The mating-side connecting portion 31 is formed in a rod shape extending in a linear direction. The terminal of the power supply connector is a female-type terminal and is fitted to the mating-side connecting portion 31 to be electrically connected to the mating-side connecting portion 31. That is, a fitting direction of the connector 1 with respect to the power supply connector corresponds to a longitudinal direction of the mating-side connecting portion 31. An arrow Y in FIG. 1 to FIG. 4 corresponds to the longitudinal direction of the mating-side connecting portion 31, i.e., the fitting direction of the connector 1. Further, an arrow X in FIG. 1 to FIG. 4 is orthogonal to the arrow Y, and an arrow Z is orthogonal to the arrow Y and the arrow X.

The wire-side connecting portion 32 is arranged on the side of the mating-side connecting portion 31 opposite to the side to which the mating connector is connected. That is, each terminal 3 extends in the linear direction, and the mating-side connecting portion 31 arranged on the one end side of the terminal is connected to the mating connector, and the wire-side connecting portion 32 arranged on the another end side of the terminal is connected to the electric wire 5. The wire-side connecting portion 32 is provided with a bolt fastening hole 33 to which the bolt 18 is screwed. When the bolt 18 is screwed to the bolt fastening hole 33, a shaft portion of the bolt 18 is positioned on a center axis of the terminal 3.

As shown in FIG. 2, the through hole 60 of the wire-side terminal 6 is placed on the bolt fastening hole 33 of the wire-side connecting portion 32, the bolt 18 is passed through the through hole 60, and the bolt 18 is screwed to the bolt fastening hole 33 to electrically connect the wire-side terminal 6 to the wire-side connecting portion 32. Similarly, the through hole 72 on the another end side of the intermediate terminal 7 is placed on the bolt fastening hole 33 of the wire-side connecting portion 32, the bolt 18 is passed through the through hole 72, and the bolt 18 is screwed to the bolt fastening hole 33 to electrically connect the intermediate terminal 7 to the wire-side connecting portion 32.

Figure 4:
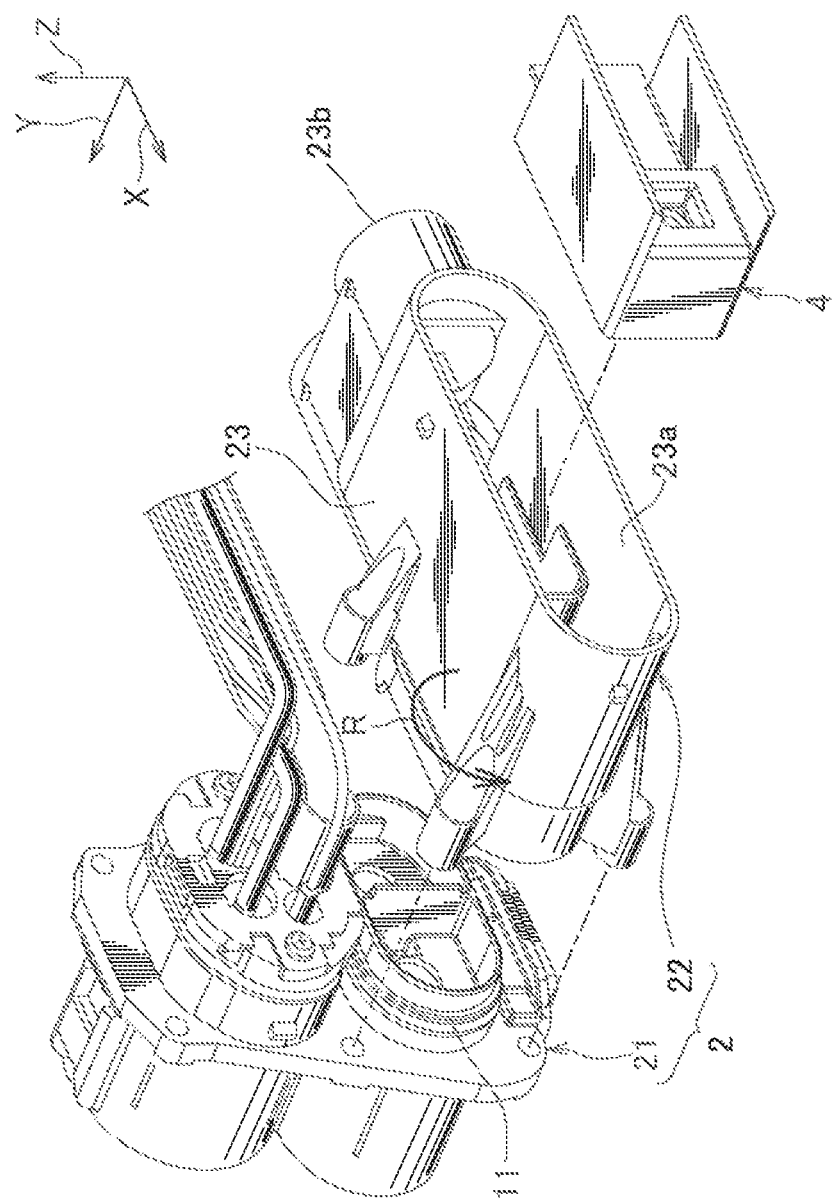
FIG. 4 is an exploded view of a housing and an insulating member of FIG. 2.

As shown in FIG. 4, the housing 2 is constituted of a first housing 21 and a second housing 22 assembled together, the first and second housings being separable. The first housing 21 and the second housing 22 are made of an insulating synthetic resin. The first housing 21 houses one end side of each terminal 3, i.e., the mating-side connecting portion 31. The second housing 22 houses the another end side of each terminal 3, i.e., the wire-side connecting portion 32, and the end of each electric wire 5. The second housing 22 extends from a connecting section where it is connected to the first housing 21 in a direction (the arrow X direction) orthogonal to the longitudinal direction (the arrow Y direction) of the terminal 3. The packing 11 is mounted to the connecting section between the first housing 21 and the second housing 22 to seal a gap between them.

As shown in FIG. 2 and FIG. 4, the second housing 22 is constituted of three components assembled together, namely, a body 23 and two covers 24 and 25 covering openings 23a and 23b formed on the body 23. The opening 23a opens on the side of the body 23 opposite to the first housing 21 in the arrow Y direction. The packing 12 seals a gap between the opening 23a and the cover 24. The opening 23b opens on the side of the body 23 away from the first housing 21 in the arrow X direction. The cover 25 covering this opening 23b is provided with openings 29 through which the electric wires 5 are passed. In this example, two openings 29 are formed since there are two electric wires 5. The rubber stoppers 13 seal a gap between the opening 23b and the electric wires 5.

Further, the second housing 22 is capable of being mounted to the first housing 21 in two orientations, namely, an orientation shown in FIG. 2 and FIG. 4 and an orientation inverted laterally (inverted in an arrow R direction in FIG. 4) with respect to the orientation shown in FIG. 2 and FIG. 4. Which orientation to apply may be selected appropriately depending on the vehicle requirements.

The two terminals 3 are housed in the housing 2 in orientations parallel to each other. The terminal 3 out of the two terminals 3 that is located closer to the openings 29 (the one on the left side in FIG. 2) is connected to the electric wire via the wire-side terminal 6. That is, the terminal 3 closer to the openings 29 is directly connected to the wire-side terminal 6. The terminal 3 out of the two terminal 3 that is located farther from the openings 29 (the one on the right side in FIG. 2) is connected to the electric wire via the intermediate terminal 7 and the wire-side terminal 6. The through holes 60 of the two wire-side terminals 6 are located on an extension of the center axis of the terminal 3 closer to the opening 29. The insulating member 4 is disposed between the adjacent wire-side terminals 6 to provide an insulation between the wire-side terminals 6. Further, as shown in FIG. 4, the insulating member 4 is inserted into the housing 2 (i.e., in the body 23) from the opening 23a of the housing 2 and mounted to the housing 2. The two electric wires 5 connected to the wire-side terminals 6, respectively, are drawn out from the openings 29 of the housing 2, respectively, in a state in which the electric wires 5 are arranged in the longitudinal direction of the terminal 3 (i.e., the arrow Y direction) and are extending straight in a direction (the arrow X direction) orthogonal to the longitudinal direction of the terminal 3. Further, in the housing 2, the two terminals 3, the two electric wires 5, the two wire-side terminals 6 and the intermediate terminal 7 are arranged on the same plane (an X-Y plane).

As compared with the conventional product (FIG. 5) in which the electric wires are drawn out from the rear surface of the housing and bent, the connector with electric wires 10 having the above-described configuration does not require the space at the rear of the connector, thus it is possible to reduce an installation area for the connector. In addition, the connector with electric wires 10 does not require an electric wire bending operation itself, thus it can be easily attached to the vehicle body.

Further, in the connector with electric wires 10, since the plurality of electric wires 5 is drawn out from the openings 29 of the housing 2 with the electric wires 5 extended straight, it is possible to downsize the connector (particularly, it is possible to downsize the connector in the arrow Z direction), as compared to the conventional product (FIG. 6) in which the electric wires are diverted so as not to interfere with each other and then aligned in the same direction. Furthermore, since the insulating member 4 is disposed between the adjacent wire-side terminals 6 to provide an insulation between the wire-side terminals 6, a pitch (in the arrow Y direction) between the wire-side terminals 6 can be reduced, thereby reducing the height.

Further, the connector with electric wires 10 can be mounted to the first housing 21 in the two orientations, namely, the orientation shown in FIG. 2 and the orientation laterally inverted with respect to the orientation shown in FIG. 2, thus it is possible to easily change the lateral electric wire draw-out directions. Thus, it is possible to share the components for the connector with electric wires 10 having two different electric wire draw-out directions.

Although the embodiment described above illustrates an example in which the connector 1 is applied to a vehicle inlet of an electric vehicle, the connector of the present invention is not limited thereto and may be applied to articles other than the vehicle inlet.

The embodiment described above only illustrates a representative embodiment of the present invention, and the present inventions is not limited thereto. That is, the present invention can be variously modified and carried out without departing from the gist of the present invention. Such modifications, as long as they have the configuration of the display device for vehicle according to the present invention, are still within the present invention.

LIST OF REFERENCE SIGNS 1 connector
2 housing
3 terminal
4 insulating member
5 electric wire
6 wire-side terminal
7 intermediate terminal
10 connector with electric wires

What is claimed is:

1. A connector comprising:
a housing; and
a plurality of terminals housed in the housing, wherein
each of the terminals is arranged to extend in a linear direction,
one end side of each of the terminals is configured to be connected to a mating connector, and another end side of each of the terminals is configured to be connected to an electric wire,
the plurality of terminals and a plurality of the electric wires connected to the plurality of terminals are arranged on a same plane in the housing, and
the plurality of electric wires is drawn out from openings of the housing with the plurality of electric wires disposed in the linear direction and extended straight,
the housing includes a first housing configured to house the one end side of the plurality of terminals and a second housing configured to house the another end side of the plurality of terminals and ends of the plurality of electric wires, and
the second housing is capable of being mounted to the first housing in two orientations including a first orientation and a second orientation, the second orientation being an inverted orientation inverted with respect to the first orientation.

2. A connector arrangement comprising:
the connector according to claim 1; and
the plurality of electric wires.

3. A connector arrangement comprising
a connector; and
a plurality of electric wires, wherein
the connector comprises:
a housing; and
a plurality of terminals housed in the housing, wherein
each of the terminals is arranged to extend in a linear direction,
one end side of each of the terminals is configured to be connected to a mating connector, and another end side of each of the terminals is configured to be connected to the electric wire,
the plurality of terminals and the plurality of the electric wires connected to the plurality of terminals are arranged on a same plane in the housing,
the plurality of electric wires is drawn out from openings of the housing with the plurality of electric wires disposed in the linear direction and extended straight,
a wire-side terminal is attached to an end of each of the electric wires, and
the terminal that is located closest to the openings is directly connected the wire-side terminal, and another terminal is connected to the wire-side terminal via an intermediate terminal.

4. The connector arrangement according to claim 3, wherein
the plurality of wire-side terminals are disposed in the linear direction, and
an insulating member is mounted inside the housing, the insulating member providing an insulation between the wire-side terminals located adjacent to each other.

* * * * *